Aug. 14, 1951         W. TUTTLE         2,563,889
GAS PRESSURE REDUCER AND REGULATOR
Filed March 31, 1948

Inventor
WAINWRIGHT TUTTLE

Patented Aug. 14, 1951

2,563,889

UNITED STATES PATENT OFFICE 2,563,889

GAS PRESSURE REDUCER AND REGULATOR

Wainwright Tuttle, Devon, Conn.

Application March 31, 1948, Serial No. 18,125

1 Claim. (Cl. 50—11)

(Granted under the act of March 3, 1883, as amended April 30, 1928; 370 O. G. 757)

The present invention relates to the control of gas pressure, and more particularly to the reduction and regulation of air pressure from the flask of a torpedo.

Conventional regulators utilize a pilot valve to produce a control pressure, which operates the main throttling means either as a fixed reference or to vary in direct or inverse proportion to any variation in inlet or outlet pressure in order to control the main throttling valve as desired.

The difficulty of providing a regulator that can handle extreme inlet pressure variations and extreme flow variations is associated with the provision of a pilot with a sensitive response which neither over controls nor under controls, to avoid chatter and sluggishness, respectively, and which has a very low spring rate and minimum friction. Such an arrangement is likely to respond to resonance and set up extreme pulsations that destroy the accuracy of regulation.

The present invention has for its principal object the provision of a pilot valve and main valve in which the flows and forces are so balanced that even with extreme inlet pressure and outlet flow variations the pilot valve substantially does not move at all, except an almost imperceptible amount to correct for any disturbances. Since the pilot in the arrangement to be described does not move appreciably, it can be very small and relatively rigid, hence avoiding delicate, easily disturbed constructions.

Another object of the invention is the elimination of springs, which may change characteristics in time, under prolonged stress.

Another object of the invention is the provision of a more simple construction, in which very close fits and extreme accuracy of machining are not necessary to produce accurate regulation.

Another object of the invention is the provision of a compact unit, wherein the large coil springs used in most regulators are eliminated.

These and other objects of the invention will become apparent from the following description when read in conjunction with the accompanying drawings, in which.

Figure 1:
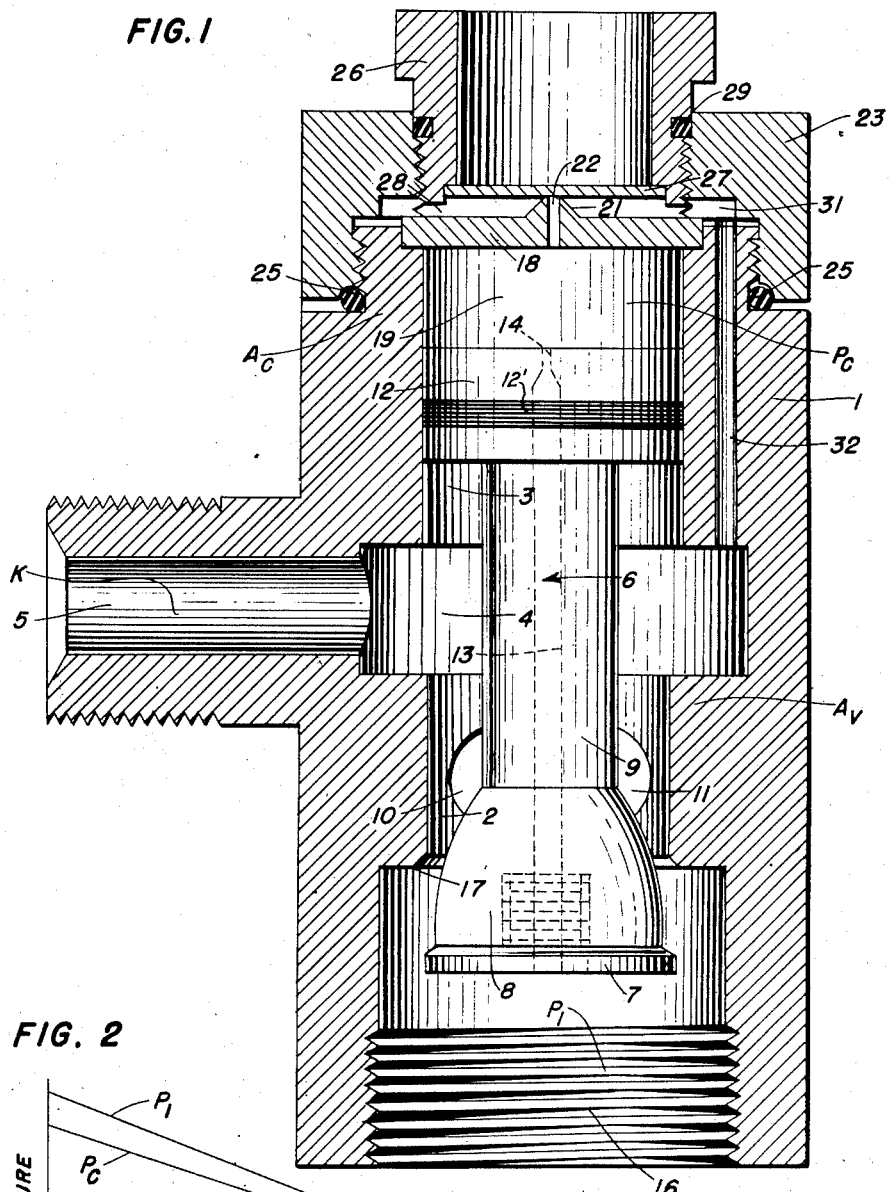
Fig. 1 is a section of a regulator consisting of a main valve and a pilot valve.

A body 1 of metal or similar material is provided with a vertical cylindrical bore 2, 3. The bore has two portions, the lower 2 being of smaller diameter than the upper 3. The central exit recess 4 leads to an outlet 5. A piston 6 is adapted to move vertically in the bore 2, 3. The piston 6 comprises a seat 7 at its lower end, a tapered throttling portion 8 above the seat 7, a reduced stem portion 9, a plurality of guides 10 and 11, and a piston head 12 provided with a seal 12', as will be more fully described hereinafter. The piston head 12 is of slightly greater diameter than that of the seat 7. Extending axially through the piston 6 from the seat 7 to almost through the head 12 is a gas passage 13, and a restricted opening 14 leads from the upper end of the passage 13 to the top of the head 12.

Gas from a reservoir is designed to enter the regulator through an inlet 16 and move the piston 6 upwardly until the seat 7 rests against a shoulder 17 of the body 1. The guides 10 and 11 center the piston 6 during its movement in the bore 2, 3.

Above the head 12 and spaced therefrom is a rigid plate 18, so that the enclosed space constitutes a control chamber 19. At its center, the plate 18 is provided with a small raised valve seat 21 containing a small port 22. The plate 18 is secured in position by a cap 23 threaded to the body 1 and sealed by a gasket 25. The cap 23 is internally threaded to hold a hollow bushing 26 at its upper end. At the bottom of the bushing 26 is an elastic diaphragm 27 that is adapted normally to bear against the port 22 to close the latter, the space between the diaphragm 27 and the rigid plate 18 constituting a shallow chamber 28. The bushing 26 may be sealed with a gland 29.

The cap 23 contains a recess 31 leading to the chamber 28. Within the body 1 and extending vertically thereof, to one side of the bore 2, 3, is a passage 32 connecting the recess 31 with the exit recess 4. The passage 32 is of sufficient size so that the pressures in the chamber 28 and the exit recess 4 are substantially equal.

When high pressure gas enters through the inlet 16, it moves the piston 6 upwardly until the upper portion of the seat 7 rests against the shoulder 17 of the body 1. The gas will now pass through the passage 13 and the restricted opening 14 into the control chamber 19, where the pressure rises until it reaches a value slightly below the incoming pressure. Because of the difference in cross section of the piston head 12 and the seat 7, the piston 6 will have more force exerted on it in a downward direction than in an upward, and as a result the piston 6 will be moved downwardly. When this happens, gas from the inlet 16 will flow into the exit recess 4 and through the passage 32 into the chamber 28 under the diaphragm 27. In this chamber 28, the pressure will build up until it is of sufficient magnitude to overcome the initial force of the diaphragm 27 on the port 22 and to move the center of the diaphragm 27 slightly upward away from the port 22. The gas will now flow from the control chamber 19 through the port 22 and through the recess 31 and the vertical passage 32 to the exit recess 4. This flow is not sufficient to alter the substantially equal pressures in the chamber 28 and the exit recess 4. As the gas passes through the small space between the rim of the port 22 and the diaphragm 27, it tends to lower the pressure in the control chamber 19. Equilibrium is established when the desired outlet pressure in the outlet 5, determined by the position of the bushing 26, has been reached in the exit recess 4. The port 22 and the diaphragm 27 amount, therefore, to a pilot valve for controlling the pressure in the main valve of the regulator.

The basic feature of the invention is in the relationship of the differential areas of the top and bottom portions of the piston 6. When these proportions are properly chosen, the position of the diaphragm 27 for various inlet pressures is always the same. Consequently, the pilot valve, comprising the port 22 and the diaphragm 27, can be small and relatively rigid, without introducing error into the regulation. The tendency to "hunt" or "overcontrol" is avoided, because the comparative rigidity of the elastic member 27 and the high damping effect of its bearing at its outer edge prevent resonant conditions and do not introduce friction errors that would otherwise be present if the diaphragm 27 had to move when the inlet pressure or flow changed. The fact that the diaphragm 27 does not move, once it has attained its equilibrium position, eliminates several errors inherent in conventional regulators due to springs, friction, oversensitivity and resonance. In the preferred embodiment, the tapering portion 8 of the piston 6 requires a large movement of the piston 6 for a change in inlet pressure or flow. This further tends to prevent pressure oscillation due to external vibration. It should be noted that any friction of the seal 12 is completely neutralized by the control pressure in the control chamber 19 produced by the position of the diaphragm 27.

The following is a demonstration of the relationship between the diameters of the bore 2 and the bore 3 to produce a constant spacing between the diaphragm 27 and the rim of the port 22 for a fixed outlet pressure.

Let $P_1$ = inlet pressure (variable)
Let $K$ = desired fixed outlet pressure
Let $P_c$ = control chamber pressure (variable)
Let $A_v$ = effective cross-sectional area of the bore 2
Let $A_c$ = effective cross-sectional area of the bore 3

Then the forces on the piston 6 for equilibrium are:

$$P_1 \times A_v + K \times A_c = K \times A_v + P_c \times A_c$$

Since $P_1 + P_c$ are the only variables, this may be written $$P_c = P_1 \times \text{a constant}$$

Figure 2:
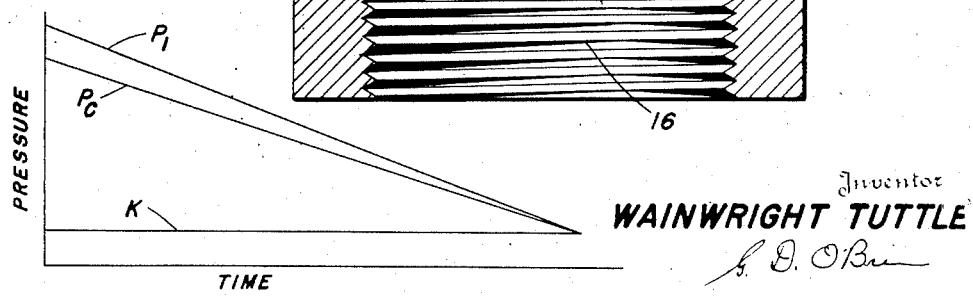
Fig. 2 is a graph showing the relation of the pressures in the regulator.

If the inlet pressure falls, the relationship will be such as shown in Fig. 2. Now the flow through the restricted opening 14 and the pilot valve formed by the port 22 and the diaphragm 27 must be equal in pounds per second. The flow through the opening 14 is dependent upon the difference between $P_1$ and $P_c$ and the density at $P_1$. The flow through the pilot valve is dependent upon the difference between $P_c$ and $K$ and the density at $P_c$. If $P_c$ were near $K$, the flow through the port 22 would vary widely, and the flow through the pilot valve would require considerable movement of the diaphragm 27. As $P_c$ is made nearer to $P_1$ by reducing the difference in area between the cylindrical bore portion 2 and the cylindrical bore portion 3, the variation in flow through the port 22 is reduced, and therefore the required variation in opening of the pilot valve from this cause is reduced. At the same time, the flow through the pilot valve when $P_1$ is high is also high because of the large differential between $P_c$ and $K$, and is low when $P_1$ is low because of the small differential between $P_c$ and $K$. In the extreme case, with $P_c$ very close to $P_1$, the pilot valve would actually have to open wider as $P_1$ decreased. Hence, there is an optimum ratio between the diameters 2 and 3 where the pilot valve spacing or opening remains constant, the required variation in flow being caused exactly by the variation in the difference in pressure between $P_c$ and $K$.

In an actual test case, the proportions were as follows:

$P_1$: 3000 to 500 p. s. i.
$P_c$: 2800 to 500 p. s. i.
$K$: 500 p. s. i.
Diam. of restricted opening 14: 0.015″
Diam. of port 22: 0.020″
Diam. of upper cylindrical bore portion 3 of main valve: 0.957″
Diam. of lower cylindrical bore portion 2 of main valve: 0.937″
Position of diaphragm 27 off seat 21: 0.001″
Movement of diaphragm 27: less than 0.0001″

Variation of $K$: ±1 p. s. i. It was a rise of 2 p. s. i. due to the high control pressure variation acting on the small area of the diaphragm 27 directly over the 0.015 diameter opening 14. This could be compensated by using a very slightly smaller diameter for the lower cylindrical bore portion 2 of the main valve.

The above preferred specific example of this invention has been described so that others may readily obtain the benefits and good results of this invention, with the understanding, however, that the invention is not so limited. Especially the invention is not necessarily limited to the particular type or construction of pilot valve shown, since it will be clear to those skilled in the art that other types including bellows, spring-loaded piston, pre-charged air chamber diaphragm, etc. may be used. Also the construction of the piston type main valve may take a form other than disclosed; or a poppet or diaphragm valve may be used as the main valve so long as a control chamber is included in which control pressure is of such a function of the inlet pressure as to result in zero movement of the pilot valve.

The invention herein described may be manufactured and used by or for the Government of the United States of America for governmental purposes without the payment of any royalties thereon or therefor.

What is claimed is:

In a fluid pressure regulator, an elongated cylindrical housing provided with coaxial bores defining a high pressure chamber at one end of the housing for connection to a fluid pressure supply source, a cylindrical control chamber spaced from said high pressure chamber and terminating at the other end of the housing in an annular recess, a low pressure chamber between said high pressure chamber and said control chamber and provided with an outlet, a rigid plate removably fitted in said annular recess and provided with an orifice extending therethrough from said control chamber and terminating in a raised seat, a piston valve reciprocable axially of said housing and including a valve portion controlling flow from said high pressure chamber to said low pressure chamber, said valve portion having an effective area exposed to fluid in the high pressure chamber for urging the valve toward a closed position, a piston portion having an effective area greater than that of said valve portion and exposed to fluid in the control chamber for urging the valve into an open position, and a stem portion connecting said valve portion and said piston portion, said piston valve being provided with an axial passageway conducting fluid at a restricted rate from said high pressure chamber to said control chamber, a bonnet sealing said housing at its end adjacent said plate, a bushing threaded into said bonnet and terminating at its inner end in an annular recess, a flexible diaphragm fitted in said bushing recess in spaced relation to said plate and normally resiliently contacting said raised seat, the space between said diaphragm and plate constituting a pilot valve chamber, said diaphragm having an effective area exposed to fluid in the pilot valve chamber for urging the diaphragm away from said seat to open said pilot valve, and means conducting fluid from said pilot valve chamber to said low pressure chamber.

WAINWRIGHT TUTTLE.

REFERENCES CITED

The following references are of record in the file of this patent:

UNITED STATES PATENTS

| Number | Name | Date |
|---|---|---|
| 213,118 | Locke | Mar. 11, 1879 |
| 873,324 | Michaels | Dec. 10, 1907 |
| 1,098,616 | Creveling | June 2, 1914 |
| 1,944,424 | Fleeson | Jan. 23, 1934 |
| 2,015,915 | Adsit | Oct. 1, 1935 |
| 2,471,294 | Watts | May 24, 1949 |